United States Patent
Deng et al.

(10) Patent No.: US 7,236,539 B2
(45) Date of Patent: Jun. 26, 2007

(54) APPARATUS AND METHOD FOR ESTIMATION OF FREQUENCY OFFSET IN WIRELESS COMMUNICATIONS

(75) Inventors: Juinn-Horng Deng, Hsinchu (TW); Ta-Sung Lee, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 694 days.

(21) Appl. No.: 10/322,384

(22) Filed: Dec. 17, 2002

(65) Prior Publication Data

US 2004/0114693 A1     Jun. 17, 2004

(51) Int. Cl.
*H04B 7/02*  (2006.01)
*H04L 1/02*  (2006.01)

(52) U.S. Cl. ............ 375/267; 375/299; 375/347
(58) Field of Classification Search ............. 375/267, 375/347, 349, 299, 316
See application file for complete search history.

(56) References Cited

U.S. PATENT DOCUMENTS

| | | | | |
|---|---|---|---|---|
| 5,461,646 A * | 10/1995 | Anvari | | 375/347 |
| 5,465,271 A * | 11/1995 | Hladik et al. | | 375/267 |
| 5,585,803 A * | 12/1996 | Miura et al. | | 342/372 |
| 5,742,583 A * | 4/1998 | Scott | | 370/342 |
| 6,185,258 B1 * | 2/2001 | Alamouti et al. | | 375/260 |
| 6,731,668 B2 * | 5/2004 | Ketchum | | 375/130 |
| 6,834,043 B1 * | 12/2004 | Vook et al. | | 370/310 |
| 6,915,116 B2 * | 7/2005 | Wang et al. | | 455/101 |
| 6,961,545 B2 * | 11/2005 | Tehrani et al. | | 455/101 |
| 7,006,579 B2 * | 2/2006 | Kuchi et al. | | 375/295 |
| 2002/0126648 A1 * | 9/2002 | Kuchi et al. | | 370/347 |
| 2002/0172293 A1 * | 11/2002 | Kuchi et al. | | 375/267 |
| 2003/0012299 A1 * | 1/2003 | Kuchi et al. | | 375/299 |
| 2003/0095533 A1 * | 5/2003 | Joo et al. | | 370/343 |

OTHER PUBLICATIONS

A Differential Detection Scheme for Transmit Diversity Tarokh, et al.; Jul. 2000.

* cited by examiner

*Primary Examiner*—Jean B. Corrielus
(74) *Attorney, Agent, or Firm*—Thomas, Kayden, Horstemeyer & Risley (57) ABSTRACT

A method and apparatus for estimation of frequency offset in wireless communications. Symbols to be transmitted are arranged in blocks of K symbols. The symbol blocks and their replicas are interleaved and then encoded into K sequences of coded symbols in space and time domains. The K coded symbol sequences are transmitted from K transmit antennas, while baseband signals carrying the coded symbols are received via J receive antennas and converted into J groups of intermediate signals. Thereafter, an interlaced operation and coherent combination is performed on each of the J intermediate signal groups. J sets of computed signals are thus generated and then combined in the space and time domains to develop a set of combined signals. Consequently, a frequency offset is estimated on the basis of this combined signal set.

16 Claims, 5 Drawing Sheets

APPARATUS AND METHOD FOR ESTIMATION OF FREQUENCY OFFSET IN WIRELESS COMMUNICATIONS

BACKGROUND OF THE INVENTION

1. Field of the Invention

The invention relates to wireless communication, and more particularly to a transmit diversity scheme used in a coherent system for estimation of frequency offset in a flat-fading environment.

2. Description of the Related Art

In the past two decades, wireless communication has grown with unprecedented speed from early radio paging, cordless telephone, and cellular telephony to today's personal communication and computing devices. These commercial wireless applications have had a profound impact on today's business world and people's daily lives. It is likely that future breakthroughs in wireless communication will be driven largely by high data rate applications. Increasing the link or channel bandwidth is a simple but costly remedy. It has been shown that Multiple-Input Multiple-Output (MIMO) systems are a viable approach to provide significant capacity improvement over conventional wireless antenna systems. MIMO links may play an important role in next-generation wireless systems.

The system performance of current wireless communication systems is limited by the major channel impairment, that is, signal fading generally caused by multipath propagation. Theoretically, the most effective technique to mitigate multipath fading in a wireless channel is transmitter power control. However, there are two fundamental problems with this approach. The major problem is the required transmitter dynamic range. The second problem is that the transmitter does not have any knowledge of the channel experienced by the receiver. Hence, the channel information has to be fed back from the receiver to the transmitter, which results in throughput degradation and considerable added complexity to both the transmitter and the receiver.

Other effective techniques such as space, time, and frequency diversity can be used to mitigate the effect of fading. Frequency and time diversity can be exploited from time-varying multipath channels while space (or antenna) diversity is achieved using multiple antennas. In the classical space diversity scheme, multiple antennas are often employed to provide diversity at the receiver. Such receiver diversity approaches may not be desirable for mobile handsets because of the cost, size and power considerations. Therefore, transmit diversity schemes have become one of the most interesting topics in wireless communications. U.S. Pat. No. 6,185,258, issued to Alamouti et al., disclose a transmitter diversity technique for wireless communications. The technique provides good diversity gain, but is very sensitive to channel estimation errors. In this patent, the receiver can only be applicable to a path fading, not channel fading, environment since it cannot deal with the carrier frequency offset. In reality, the frequency offset always exists due to the difference of the oscillator frequencies between the transmitter and the receiver or the Doppler frequency shift effect for mobile communications. Tarokh et al. disclose a differential modulation for two transmit antennas and one receive antenna based on Alamouti's method, see "A differential detection scheme for transmit diversity," *IEEE J. Select. Areas Commun.*, Vol. 18, No. 7 pp. 1169–1194, July, 2000. In this scheme, the receiver executes differential detection and requires no channel state information to accomplish low decoding complexity. Unfortunately, the differential encoding scheme without estimation of frequency offset is suited only to a noncoherent system but not to a coherent system.

In view of the above, what is needed is a novel transmit diversity scheme applicable to a coherent system, unencumbered by the limitations associated with the prior art.

SUMMARY OF THE INVENTION

It is an object of the present invention to provide a method used in a coherent system for effective estimation of frequency offset in a flat-fading environment.

It is another object of the present invention to provide a mobile communication arrangement suitable for integrated circuits, which offers the benefits of space and time diversity without the use of channel estimation.

According to one aspect of the invention, an apparatus for wireless transmission of symbols via multiple antennas includes a block replicater, a space-time encoder and an output stage. The block replicater arranges symbols to be transmitted in blocks of K symbols, where K is the number of transmit antennas. The block replicater subsequently outputs each symbol block followed by a replica thereof. The space-time encoder generates K sequences of coded symbols by respectively encoding each symbol block and its replica in space and time domains. Then, the output stage transmits the K coded symbol sequences from K antennas, respectively.

According to another aspect of the invention, an apparatus for wireless reception of signals via multiple antennas is disclosed. The inventive apparatus includes a space-time combiner and an estimator, J distributors and J block processors, where J is the number of receive antennas. The J distributors receive respective baseband signals from corresponding antennas and each distributor converts the received baseband signal into a group of intermediate signals. Each of the J block processors performs an interlaced operation and coherent combination on the corresponding group of intermediate signals to generate a set of computed signals. The space-time combiner then combines J sets of computed signals from the J block processors in space and time domains, thereby generating a set of combined signals. Thus, the estimator can estimate a frequency offset based on the set of combined signals.

According to yet another aspect of the invention, a method for estimation of frequency offset in wireless communications is provided. The first step of the method comprises arrangement of symbols to be transmitted in blocks of K symbols as well as interleaving of each symbol block and its replica, where K is the number of transmit antennas. Thereafter, each symbol block and its replica are encoded in space and time domains into K sequences of coded symbols. The K coded symbol sequences are then transmitted from K transmit antennas, separately. Hence, baseband signals including the coded symbols are separately received via J receive antennas, where J is the number of receive antennas. The received baseband signals are converted into J groups of intermediate signals, respectively. After that, an interlaced operation and coherent combination is performed on each of the J intermediate signal groups to generate J sets of computed signals respectively. The J computed signal sets are combined together in the space and time domains to derive a set of combined signals. As a result, a frequency offset is estimated on the basis of the combined signal set.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
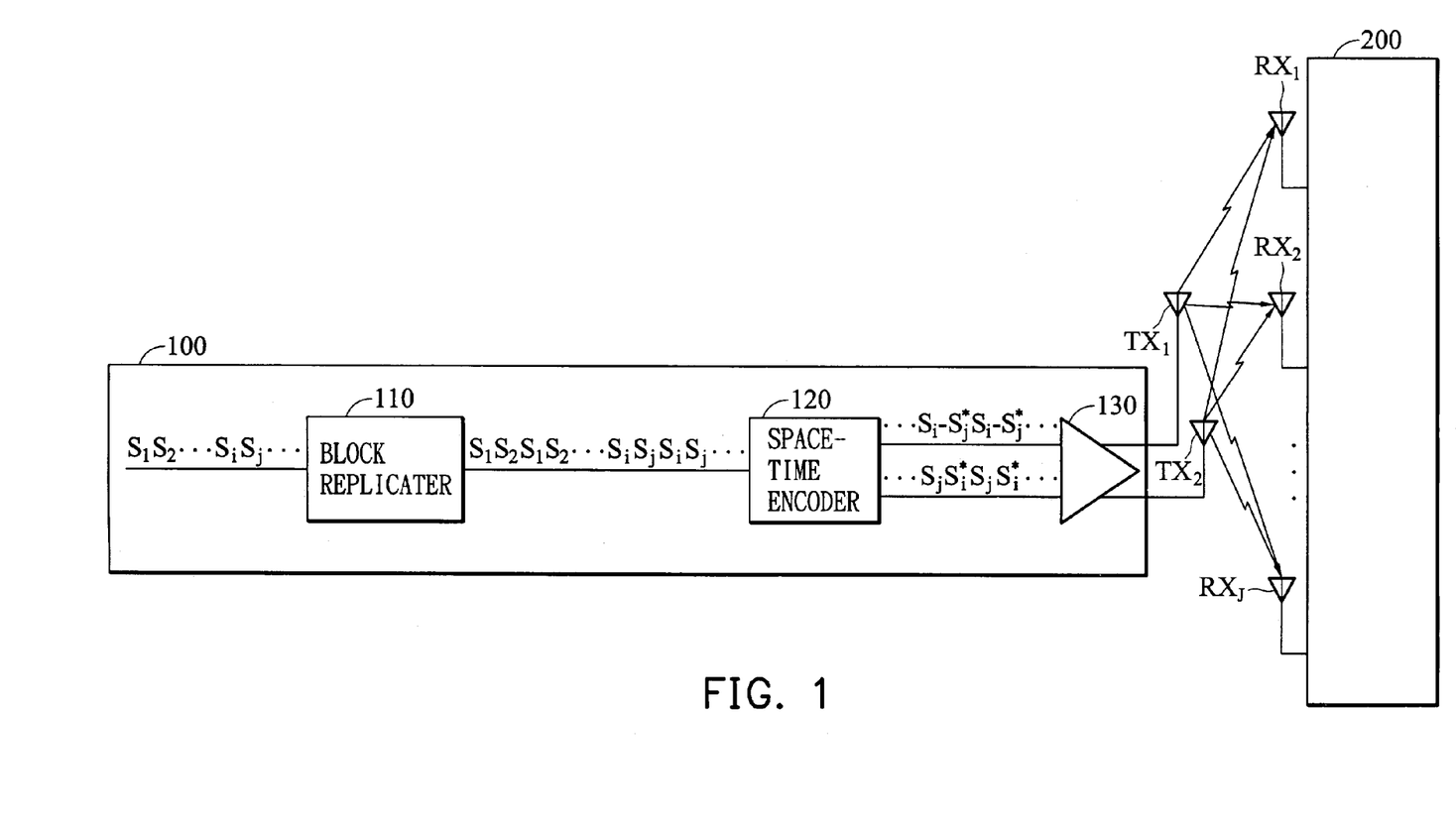
FIG. 1 is a block diagram illustrating a transmitter according to the invention.

FIG. 1 shows a block diagram focused on a transmitter in accordance with an embodiment of the invention. The transmitter 100 includes multiple antennas to provide space diversity, although, for illustrative simplicity, the illustrative example employs only two transmit antennas $TX_1$ and $TX_2$. Note that binary baseband data to be transmitted is digitally modulated with binary phase shift keying (BPSK) or quadrature phase shift keying (QPSK). In aid of frequency offset estimation, a symbol stream $\{S_1, S_2, \ldots, S_i, S_j, \ldots\}$ is first fed to a block replicater 110 of the transmitter 100. The block replicater 110 arranges the symbols to be transmitted in blocks of K symbols, where K is the number of transmit antennas. Since K equals 2 in the exemplary embodiment of FIG. 1, the block replicater 110 groups the transmitted symbols into blocks of two adjacent symbols $\{S_i, S_j\}$. Thereafter, the block replicater 110 sends every two adjacent symbols $\{S_i, S_j\}$ to a space-time encoder 120 and sends the two symbols $\{S_i, S_j\}$ once again. In other words, the block replicater 110 interleaves each symbol block $\{S_i, S_j\}$ and its replica as $\{S_i, S_j, S_i, S_j\}$ and outputs each symbol block followed by a replica thereof. The output of the block replicater 110, for instance, is $\{S_1, S_2, S_1, S_2, \ldots, S_i, S_j, S_i, S_j, \ldots\}$.

The space-time encoder 120 generates K sequences of coded symbols by respectively encoding each symbol block and its replica in space and time domains. To provide space and time diversity, a space-time block encoding is performed on each symbol block and its replica. In the two-antenna embodiment, the sequence $\{S_1, S_2, S_1, S_2, \ldots, S_i, S_j, S_i, S_j, \ldots\}$ is encoded into two coded symbol sequences, i.e., a first sequence of coded symbols $\{S_1, -S_2^*, S_1, -S_2^*, \ldots, S_i, -S_j^*, S_i, -S_j^*, \ldots\}$ and a second sequence of coded symbols $\{S_2, S_1^*, S_2, S_1^*, \ldots, S_j, S_i^*, S_j, S_i^*, \ldots\}$, where * appended to a symbol represents the complex conjugate of that symbol. It should be appreciated that the principles of the invention are applicable to transmitters with more than two antennas. The coded symbol sequences are sent to an output stage 130 where upconversion and power amplification are performed. Then, the output stage 130 applies the first coded symbol sequence $\{\ldots, S_i, -S_j^*, S_i, -S_j^*, \ldots\}$ to the antenna $TX_1$, and the second coded symbol sequence $\{\ldots, S_j, S_i^*, S_j, S_i^*, \ldots\}$ to the antenna $TX_2$, and transmits them from the two antennas, respectively. At each time slot, two symbols are simultaneously transmitted from the antennas $TX_1$ and $TX_2$. Table 1 illustrates the encoding and transmission sequence for the transmitter 100 in accordance with the invention.

TABLE 1

The Order of Coded Symbols

| | Time | | | | | | | |
|---|---|---|---|---|---|---|---|---|
| | $t_0$ | $t_1$ | $t_2$ | $t_3$ | $t_4$ | $t_5$ | $t_6$ | $t_7$ ... |
| Antenna $TX_1$ | $S_1$ | $-S_2^*$ | $S_1$ | $-S_2^*$ | $S_3$ | $-S_4^*$ | $S_3$ | $-S_4^*$ ... |
| Antenna $TX_2$ | $S_2$ | $S_1^*$ | $S_2$ | $S_1^*$ | $S_4$ | $S_3^*$ | $S_4$ | $S_3^*$ ... |

Still referring to FIG. 1, in this case, a diversity order of 2J with two transmit antennas and J receive antennas is provided. In a flat-fading environment, channels between the transmit antennas $TX_1$, $TX_2$ and the jth receive antenna $RX_j$ are denoted by $h_{1,j}$ and $h_{2,j}$, respectively, assuming that fading is constant within two consecutive block durations. Table 2 here summarizes the definition of channels between the transmit and receive antennas.

TABLE 2

| | Antenna $RX_1$ | Antenna $RX_2$ | ... | Antenna $RX_j$ | ... | Antenna $RX_J$ |
|---|---|---|---|---|---|---|
| Antenna $TX_1$ | $h_{1,1}$ | $h_{1,2}$ | ... | $h_{1,j}$ | | $h_{1,J}$ |
| Antenna $TX_2$ | $h_{2,1}$ | $h_{2,2}$ | ... | $h_{2,j}$ | ... | $h_{2,J}$ |

Figure 2:
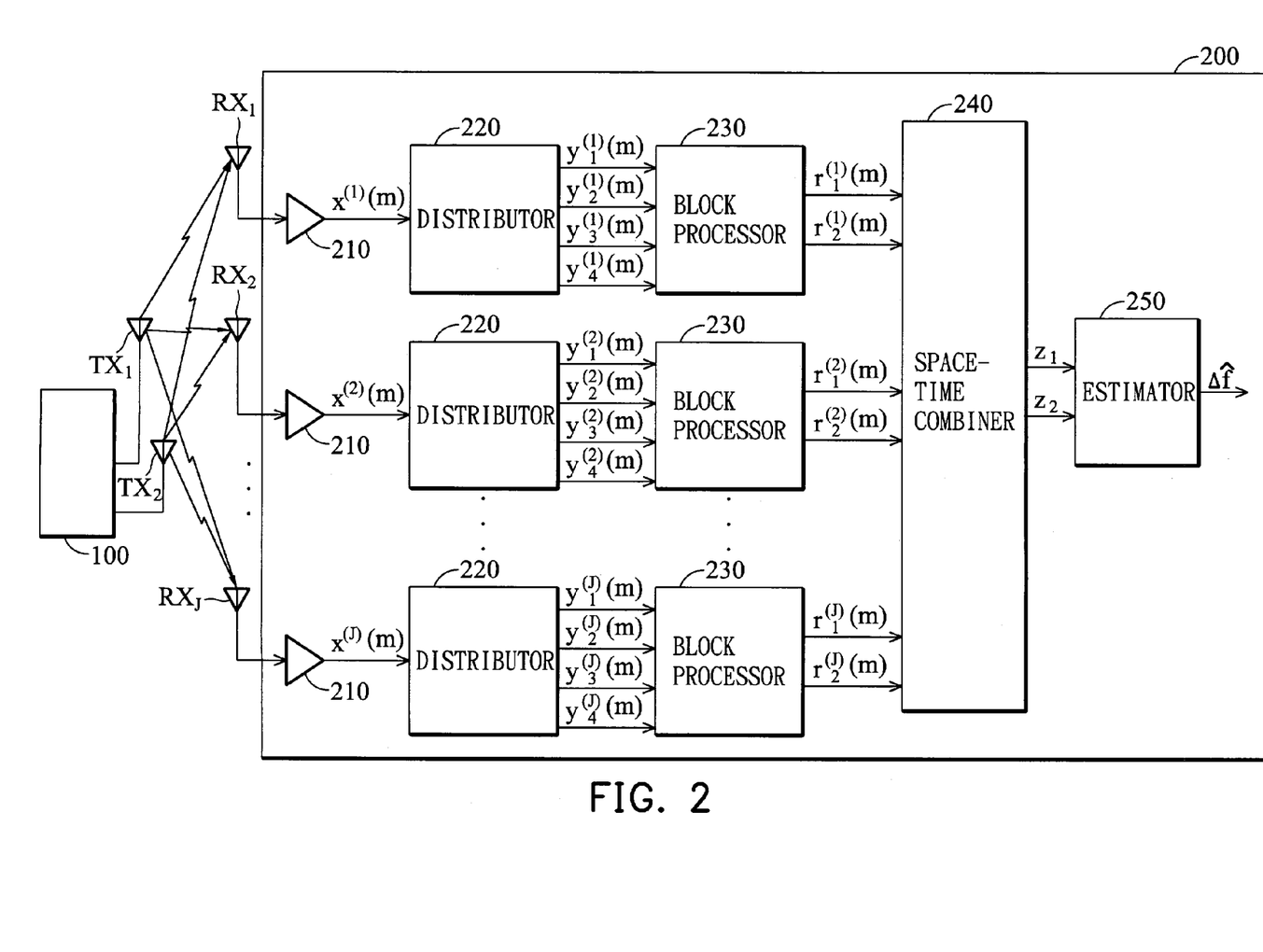
FIG. 2 is a block diagram illustrating a receiver according to the invention.

FIG. 2 shows a block diagram of a receiver in accordance with the invention. Baseband signals $x^{(1)}(n)$ through $x^{(J)}(n)$ received via the antennas $RX_1$ through $RX_J$ are downconverted by J input stages 210 of the receiver 200, where J is the number of receive antennas. The baseband signals $x^{(1)}(n) \sim x^{(J)}(n)$ are then fed to J distributors 220, respectively. At a given time interval m, the jth distributor 220 converts the received baseband signal $x^{(j)}(n)$ into a group of intermediate signals:

$$y_i^{(j)}(m) = x^{(j)}(4(m-1)+i), \text{ for } i=1, 2, 3, 4 \text{ and } j \in J$$

where n=4m. Furthermore, the jth group of intermediate signals $y^{(j)}(m)$ at the given time interval m can be expressed as $$y_1^{(j)}(m) = x^{(j)}(4m-3) = (S_{2(m-1)+1} \cdot h_{1,j} + S_{2(m-1)+2} \cdot h_{2,j}) \cdot e^{j2\pi \Delta f \cdot t_0} + N_1 \quad (1)$$

$$y_2^{(j)}(m) = x^{(j)}(4m-2) = (-S_{2(m-1)+2}^* \cdot h_{1,j} + S_{2(m-1)+1}^* \cdot h_{2,j}) \cdot e^{j2\pi \Delta f \cdot (t_0+T)} + N_2 \quad (2)$$

$$y_3^{(j)}(m) = x^{(j)}(4m-1) = (S_{2(m-1)+1} \cdot h_{1,j} + S_{2(m-1)+2} \cdot h_{2,j}) \cdot e^{j2\pi \Delta f \cdot (t_0+2T)} + N_3 \quad (3)$$

$$y_4^{(j)}(m) = x^{(j)}(4m) = (-S_{2(m-1)+2}^* \cdot h_{1,j} + S_{2(m-1)+1}^* \cdot h_{2,j}) \cdot e^{j2\pi \Delta f \cdot (t_0+3T)} + N_4 \quad (4)$$

where $\Delta f$ is an actual frequency offset, $t_0$ is an initial time, T is a symbol period for every symbols $S_{2(m-1)+1}$ and $S_{2(m-1)+2}$, and $N_1$ to $N_4$ represent additive white Gaussian noise.

Figure 3:
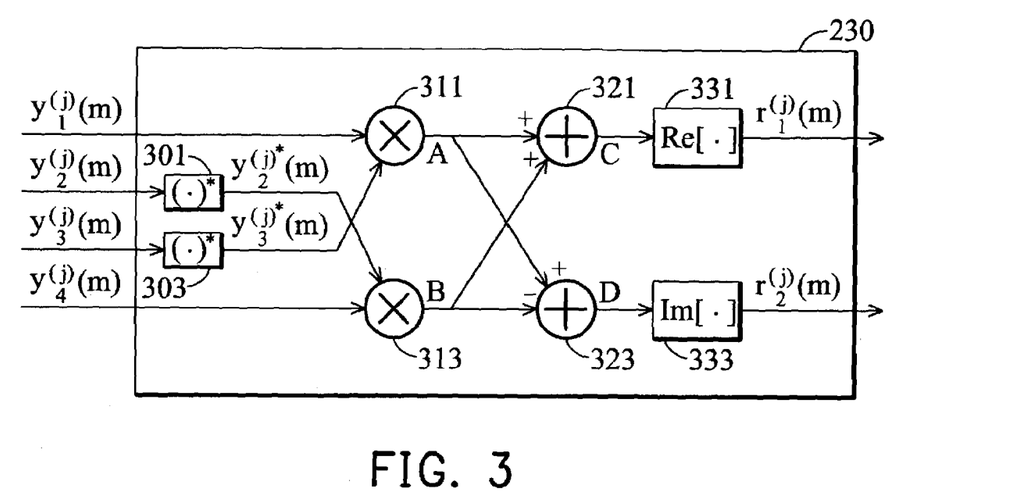
FIG. 3 is a detailed block diagram illustrating a block processor of FIG. 2.

The J intermediate signal groups are sent to J block processors 230 where interlaced operations and coherent combinations are performed to generate J sets of computed signals $r_1^{(j)}(m)$ and $r_2^{(j)}(m)$ for j=1, ..., J. FIG. 3 is a more detailed block diagram of an embodiment of the block processor 230. As depicted, each block processor is comprised of two conjugate operators 301 and 303, two complex multipliers 311 and 313, two adders 321 and 323, a real part operator 331 and an imaginary part operator 333. As depicted, $y_2^{(j)}(m)$ and $y_3^{(j)}(m)$ are sent to the conjugate operators 301, 303 where conjugations are employed to respectively obtain $y_2^{(j)*}(m)$ and $y_2^{(j)*}(m)$. Here * superscript defines the complex conjugate operation. To eliminate the influence of unknown channels and signals, $y_2^{(j)*}(m)$ and $y_3^{(j)*}(m)$ are interlaced and fed to the complex multipliers 311 and 313 where product A of $y_1^{(j)}(m)$ and $y_3^{(j)*}(m)$ and product B of $y_2^{(j)*}(m)$ and $y_4^{(j)}(m)$ are calculated. The sum C of the products A and B is added by the adder 321. In a similar fashion, the sum D of the product A and a negative of the product B is added by the adder 323. Finally, the real part operators 331 return the real part of the sum C and the imaginary part operator 333 return the imaginary part of the sum D, thereby forming the jth set of computed signals $$r_1^{(j)}(m) = Re[y_1^{(j)}(m) \cdot y_3^{(j)*}(m) + y_2^{(j)*}(m) \cdot y_4^{(j)}(m)] \quad (5)$$

$$r_2^{(j)}(m) = Im[y_1^{(j)}(m) \cdot y_3^{(j)*}(m) - y_2^{(j)*}(m) \cdot y_4^{(j)}(m)] \quad (6)$$

where Re[] and Im[] represent the real and imaginary part of complex numbers, respectively. Substituting equations (1)~(4) into (5) and (6) yields $$r_1^{(j)}(m) = \left\{\sum_{k=1}^{2} |h_{k,j}|^2\right\} \cdot \left\{\sum_{k=1}^{2} |S_{2(m-1)+k}|^2\right\} \cdot \cos(2\pi \cdot \Delta f \cdot 2T) + N_1' \quad (7)$$

$$r_2^{(j)}(m) = -\left\{\sum_{k=1}^{2} |h_{k,j}|^2\right\} \cdot \left\{\sum_{k=1}^{2} |S_{2(m-1)+k}|^2\right\} \cdot \sin(2\pi \cdot \Delta f \cdot 2T) + N_2' \quad (8)$$

where $N_1'$ and $N_2'$ represent the additive white Gaussian noise after performing the interlaced operation and coherent combination. From the equations (7) and (8), the unknown channel transfer functions $h_{k,j}$ are coherently combined, as are the unknown signals $S_{2(m-1)+k}$. In addition, the signal-to-noise ratio (SNR) of the sinusoidal waveforms of $r_1^{(j)}(m)$ and $r_2^{(j)}(m)$ is increased due to the time diversity.

Figure 4:
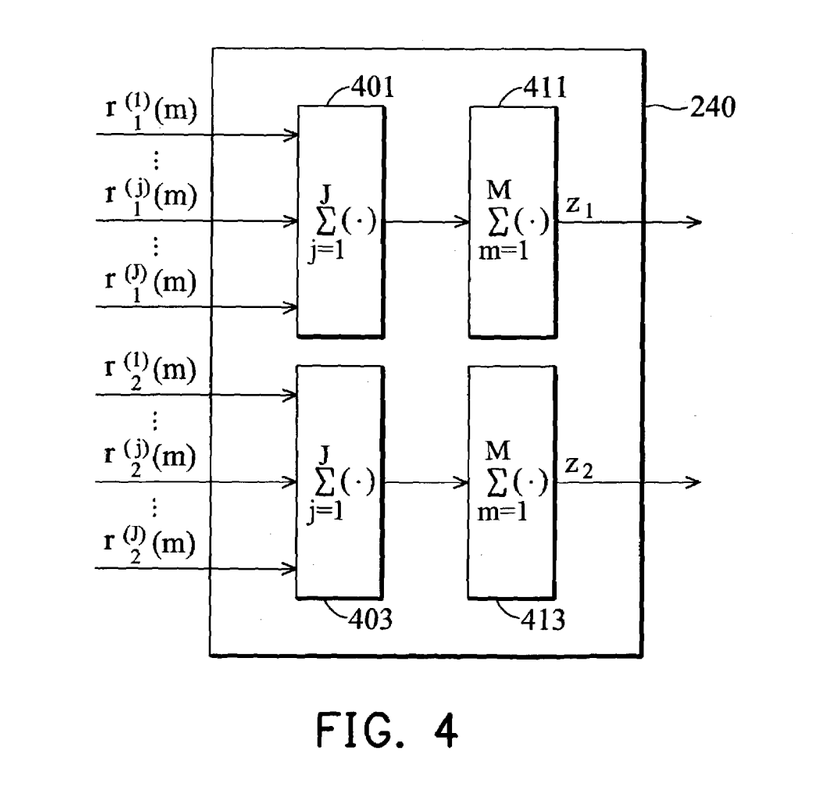
FIG. 4 is a detailed block diagram illustrating a space-time combiner of FIG. 2.

After that, the space-time combiner 240 combines the J computed signal sets from the J block processors 230 in space and time domains. FIG. 4 shows a more detailed block diagram of an embodiment of the space-time combiner 240. As depicted, the space-time combiner 240 is made up of two accumulators 401 and 403 for a J-dimensional space domain and two accumulators 411 and 413 for an M-dimensional time domain. With these accumulators, the space-time combiner 240 takes double summations of $r_1^{(j)}(m)$ and $r_2^{(j)}(m)$ over the J-dimensional space and M-dimensional time domains as follows:

$$z_1 = \sum_{m=1}^{M} \sum_{j=1}^{J} r_1^{(j)}(m)$$

$$z_2 = \sum_{m=1}^{M} \sum_{j=1}^{J} r_2^{(j)}(m)$$

where $z_1$ and $z_2$ form the set of combined signals. In this way, the space-time diversity gain is achieved, the SNR is further increased, and the frequency offset estimation can thus be improved.

Figure 5:
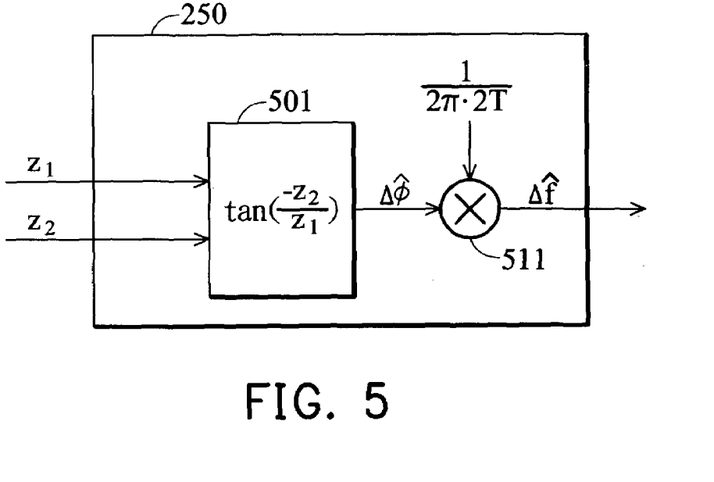
FIG. 5 is a detailed block diagram illustrating an estimator of FIG. 2.

Turning now to FIG. 5, the estimator 250 includes an arctangent unit 501 and a multiplier 511. Based on the set of combined signals $z_1$ and $z_2$, the estimator 250 can attain an estimated frequency offset. In this regard, the arctangent unit 501 performs the trigonometric arctangent operation on $-z_2/z_1$ to estimate a phase offset $$\Delta\hat{\phi} = \tan^{-1}\left(\frac{-z_2}{z_1}\right)$$

where $\Delta\hat{\phi}$ is an estimated phase offset. Then, the estimated phase offset is fed to the multiplier 510 where $\Delta\hat{\phi}$ is multiplied by a constant $1/(2\pi \cdot 2T)$. As a result, the estimated frequency offset is expressed as $$\Delta\hat{f} = \frac{1}{2\pi \cdot 2T}\tan^{-1}\left(\frac{-z_2}{z_1}\right)$$

Figure 6:
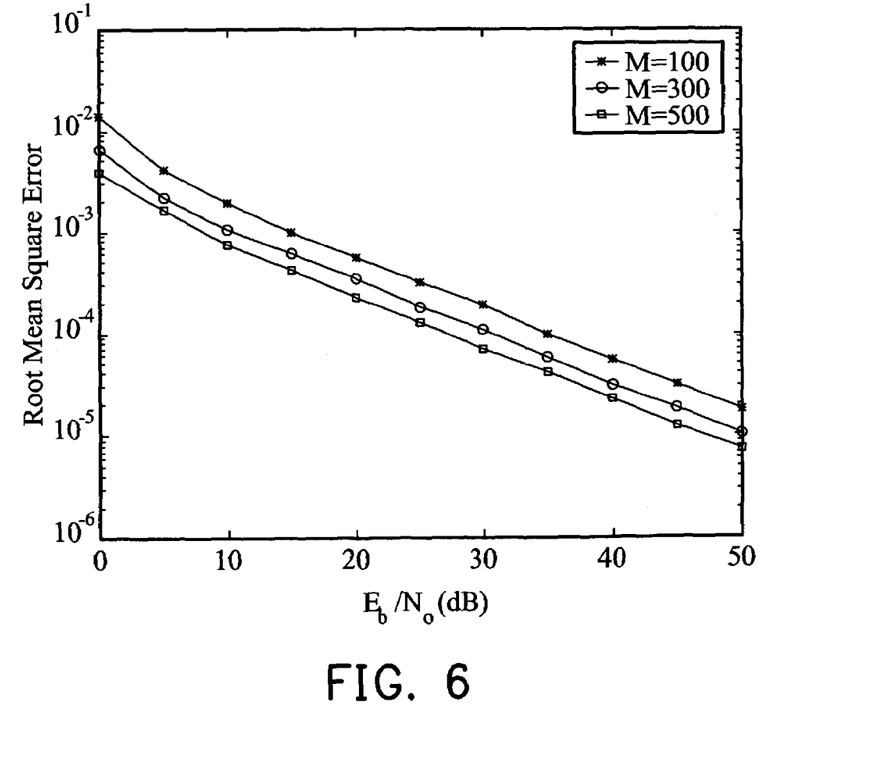
FIGS. 6~8 are graphs showing simulation results of the invention.
Figure 7:
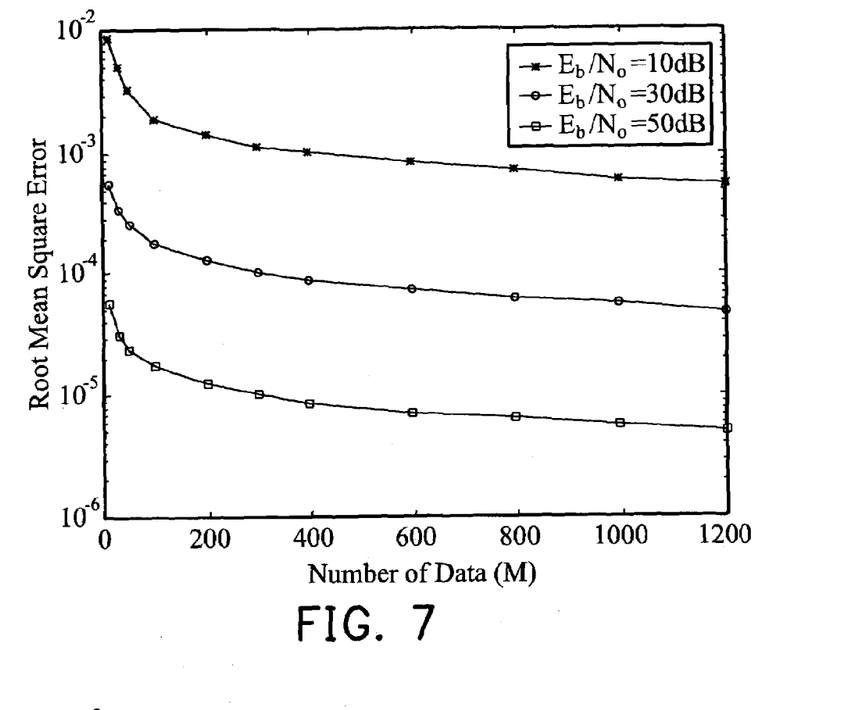
Figure 8:
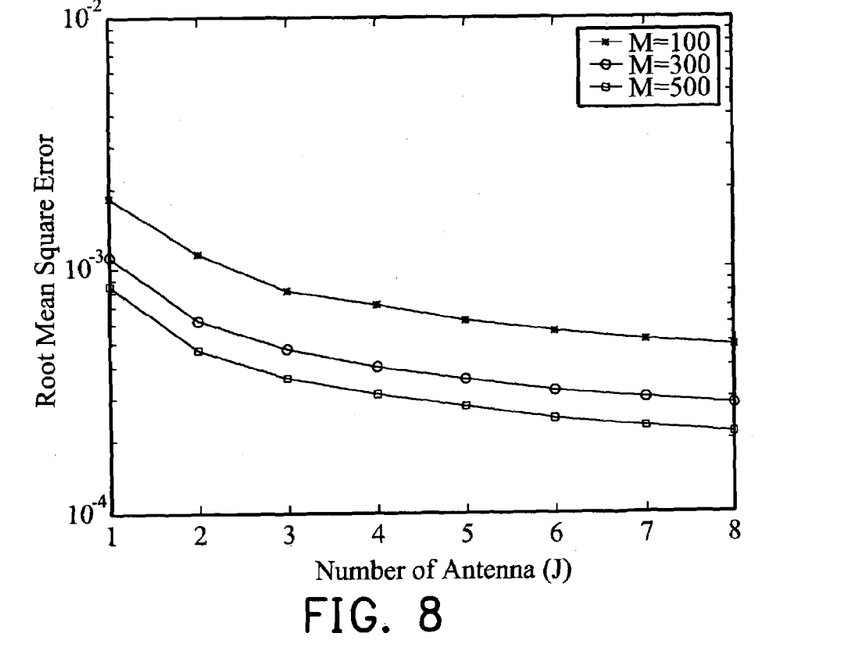

FIGS. 6 through 7 demonstrate simulation results of the invention. In the simulation, the actual frequency offset is assumed to be 30 KHz in a Rayleigh flat-fading environment. It is also assumed that there are two transmit antennas and J receive antennas (J=1, 2, 4). It is also assumed that the symbol period T is 5 μsec, so Δf·T is 0.15. As shown in FIG. 6, with one receive antenna (J=1) and M data samples (M=100, 300, 500), the root mean square error (RMSE) of the estimated frequency offset Δf decreases when SNR ($E_b/N_0$) increases. Apart from $E_b/N_0$, FIG. 6 presents that the more data samples employed, the lower the RMSE of Δf. In FIG. 7, if J=1 and $E_b/N_0$ equals 10 dB, 30 dB, and 50 dB, the RMSE of Δf declines rapidly if the number of data samples M is less than 300. When M reaches 1200, the RMSE of Δf converges toward a constant. In FIG. 8, if $E_b/N_0$ is 10 dB and the number of data samples M is 100, 300 and 500, the RMSE of Δf is reduced as the receive antenna number grows.

Accordingly, the invention provides a novel scheme to estimate the frequency offset of a flat-fading environment. The scheme of the invention offers the benefits of space and time diversity without the requirement of channel estimation. It is also shown that the invention is well-suited for MIMO wireless systems. Due to low computation complexity, the inventive arrangement is very simple to implement in an integrated circuit.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for wireless reception of signals via multiple antennas, comprising:

J distributors receiving respective discrete baseband signals from corresponding antennas where J is an integer greater than zero, and each distributor is configured to collet the received discrete baseband signal within a time interval to form a group of intermediate signals;

J block processors, each coupled to a respective one of said J distributors and is configured to perform a coherent combination by complex conjugate operation, inter-signal multiplication and addition an the corresponding group of intermediate signals to generate a set of computed signals;

a space-time combiner for combining J sets of computed signals from the J block processors in space and time domains to generate a set of combined signals; and an estimator for estimating a frequency offset based on the set of combined signals.

2. The apparatus for wireless reception according to claim 1, wherein each of the distributors develops the respective group of intermediate signals group as $$y_i^{(j)}(m)=x^{(j)}(4(m-1)+i), \text{ for } i=1,2,3,4 \text{ and } j \in J$$

where $y^{(j)}(m)$ is the jth group of intermediate signals output by the jth distributor at a given time interval m, $x^{(j)}(n)$ is the received baseband signal via the jth antenna and n=4m.

3. The apparatus for wireless reception according to claim 2, wherein the received baseband signal $x^{(j)}(n)$ comprises a symbol block and a replica thereof in which the symbol block is made up of symbols $S_{2(m-1)+1}$ and $S_{2(m-1)+2}$.

4. The apparatus for wireless reception according to claim 3, wherein the intermediate signals $y_i^{(j)}(m)$ converted by the jth distributor at the given time interval m correspond to $$y_1^{(j)}(m)=x^{(j)}(4m-3)=(S_{2(m-1)+1} \cdot h_{1,j} + S_{2(m-1)+2} \cdot h_{2,j}) \cdot e^{j2\pi \cdot \Delta f \cdot t_0} + N_1$$

$$y_2^{(j)}(m)=x^{(j)}(4m-2)=(-S_{2(m-1)+2}^* \cdot h_{1,j} + S_{2(m-1)+1}^* \cdot h_{2,j}) \cdot e^{j2\pi \cdot \Delta f \cdot (t_0+T)} + N_2$$

$$y_3^{(j)}(m)=x^{(j)}(4m-1)=(S_{2(m-1)+1} \cdot h_{1,j} + S_{2(m-1)+2} \cdot h_{2,j}) \cdot e^{j2\pi \cdot \Delta f \cdot (t_0+2T)} + N_3$$

$$y_4^{(j)}(m)=x^{(j)}(4m)=(-S_{2(m-1)+2}^* \cdot h_{1,j} + S_{2(m-1)+1}^* \cdot h_{2,j}) \cdot e^{j2\pi \cdot \Delta f \cdot (t_0+3T)} + N_4$$

where $\Delta f$ is an actual frequency offset, $t_0$ is an initial time, T is a symbol period for every symbols $S_{2(m-1)+1}$ and $S_{2(m-1)+2}$, $N_1$ to $N_4$ represent additive white Gaussian noise, $h_{1,j}$ and $h_{2,j}$ represent a first and second channel with respect to the jth antenna, respectively, and * appended to the symbol $S_{2(m-1)+1}$ or $S_{2(m-1)+2}$ represents the complex conjugate of that symbol.

5. The apparatus for wireless reception according to claim 4, wherein the jth block processor obtains the jth set of computed signals by performing a coherent combination on the jth group of intermediate signals $y_i^{(j)}(m)$ as follows:

$$r_1^{(j)}(m)=\text{Re}[y_1^{(j)}(m) \cdot y_3^{(j)*}(m) + y_2^{(j)*}(m) \cdot y_4^{(j)}(m)]$$

$$r_2^{(j)}(m)=\text{Im}[y_1^{(j)}(m) \cdot y_3^{(j)*}(m) - y_2^{(j)*}(m) \cdot y_4^{(j)}(m)]$$

where Re[ ] and Im[ ] represent the real and imaginary part of complex numbers, respectively, $y_2^{(j)*}(m)$ is the complex conjugate of $y_2^{(j)}(m)$, $y_3^{(j)*}(m)$ is the complex conjugate of $y_3^{(j)}(m)$, and $r_1^{(j)}(m)$ and $r_2^{(j)}(m)$ form the jth set of computed signals at the given time interval m.

6. The apparatus for wireless reception according to claim 5, wherein the space-time combiner combines the J sets of computed signals from the J block processors by taking double summations over a J-dimensional space domain and an M-dimensional time domain:

$$z_1 = \sum_{m=1}^{M} \sum_{j=1}^{J} r_1^{(j)}(m)$$

$$z_2 = \sum_{m=1}^{M} \sum_{j=1}^{J} r_2^{(j)}(m)$$

where $z_1$ and $z_2$ form the set of combined signals.

7. The apparatus for wireless reception according to claim 6, wherein the estimator obtains the estimated frequency offset by calculating:

$$\Delta \hat{f} = \frac{1}{2\pi \cdot 2T} \tan^{-1}\left(\frac{-z_2}{z_1}\right)$$

where $\Delta \hat{f}$ is the estimated frequency offset.

8. A method for estimation of frequency offset in wireless communications, comprising the steps of:

arranging symbols to be transmitted in blocks of K symbols and interleaving each symbol block and a replica thereof, where K is a first integer greater than one;

encoding each symbol block and the replica thereof in space as well as time domains into K sequences of coded symbols;

separately transmitting the K coded symbol sequences from K transmit antennas;

separately receiving baseband signals including the coded symbols via J receive antennas, where J is a second integer greater than zero;

respectively converting the received baseband signals within a time interval as J groups of intermediate signals;

respectively performing a coherent combination on each of the J intermediate signal groups by complex conjugate operation, inter-signal multiplication and addition to generate J sets of computed signals;

combining the J computed signal sets in the space and time domains to generate a set of combined signals; and estimating a frequency offset based on the set of combined signals.

9. The method for estimation of frequency offset in wireless communications according to claim 8, wherein the symbols to be transmitted are arranged in blocks of two adjacent symbols $\{S_i,S_j\}$ and each symbol block and the replica thereof are interleaved as $\{S_i,S_j,S_i,S_j\}$ when K=2.

10. The method for estimation of frequency offset in wireless communications according to claim 9, wherein the encoding step encodes the symbol block $\{S_i,S_j\}$ and the replica thereof into a first sequence of coded symbols $\{S_i,-S_j^*,S_i,-S_j^*\}$ and a second sequence of coded symbols $\{S_j,S_i^*,S_j,S_i^*\}$, where * appended to the symbol $S_i$ or $S_j$ represents the complex conjugate of that symbol.

11. The method for estimation of frequency offset in wireless communications according to claim 10, wherein the transmitting step transmits the first coded symbol sequence $\{S_i,-S_j^*,S_i,-S_j^*\}$ from a first transmit antenna and transmits the second code symbol $\{S_j,S_i^*,S_j,S_i^*\}$ from a second transmit antenna, separately.

12. The method for estimation of frequency offset in wireless communications according to claim 8, wherein the converting step develops the J groups of intermediate signals as $$y_i^{(j)}(m)=x^{(j)}(4(m-1)+i), \text{ for } i=1,2,3,4 \text{ and } j \in J$$

where $y_i^{(j)}(m)$ is the jth group of intermediate signals at a given time interval m, $x^{(j)}(n)$ is the jth received baseband signal via the jth receive antenna and n=4m.

13. The method for estimation of frequency offset in wireless communications according to claim 12, wherein the intermediate signals $y_i^{(j)}(m)$ at the given time interval m correspond to $$y_1^{(j)}(m) = x^{(j)}(4m-3) = (S_{2(m-1)+1} \cdot h_{1,j} + S_{2(m-1)+2} \cdot h_{2,j}) \cdot e^{j2\pi \cdot \Delta f \cdot t_0} + N_1$$

$$y_2^{(j)}(m) = x^{(j)}(4m-2) = (-S^*_{2(m-1)+2} \cdot h_{1,j} + S^*_{2(m-1)+1} \cdot h_{2,j}) \cdot e^{j2\pi \cdot \Delta f \cdot (t_0+T)} + N_2$$

$$y_3^{(j)}(m) = x^{(j)}(4m-1) = (S_{2(m-1)+1} \cdot h_{1,j} + S_{2(m-1)+2} \cdot h_{2,j}) \cdot e^{j2\pi \cdot \Delta f \cdot (t_0+2T)} + N_3$$

$$y_4^{(j)}(m) = x^{(j)}(4m) = (-S^*_{2(m-1)+2} \cdot h_{1,j} + S^*_{2(m-1)+1} \cdot h_{2,j}) \cdot e^{j2\pi \cdot \Delta f \cdot (t_0+3T)} + N_4$$

where $S_{2(m-1)+1}$, $S_{2(m-1)+2}$, $S_{(m-1)+1}^*$ and $S_{2(m-1)+2}^*$ are constituents of the coded symbols in which * appended to the symbol $S_{2(m-1)+1}$ or $S_{2(m-1)+2}$ represents the complex conjugate of that symbol, $\Delta f$ is an actual frequency offset, $t_0$ is an initial time, T is a symbol period for every symbol $S_{2(m-1)+1}$ and $S_{2(m-1)+2}$, $N_1$ to $N_4$ represent additive white Gaussian noise, and when K=2, $h_{1,j}$ represents a first channel between a first transmit antenna and the jth receive antenna, $h_{2,j}$ represents a second channel between a second transmit antenna and the jth receive antenna.

14. The method for estimation of frequency offset in wireless communications according to claim 12, wherein the jth set of computed signals obtained by performing the a coherent combination on the jth group of intermediate signals $y_i^{(j)}(m)$ are $$r_1^{(j)}(m) = Re[y_1^{(j)}(m) \cdot y_3^{(j)*}(m) + y_2^{(j)*}(m) \cdot y_4^{(j)}(m)]$$

$$r_2^{(j)}(m) = Im[y_1^{(j)}(m) \cdot y_3^{(j)*}(m) - y_2^{(j)*}(m) \cdot y_4^{(j)}(m)]$$

where Re[ ] and Im[ ] represent the real and imaginary part of complex numbers, respectively, $y_2^{(j)*}(m)$ is the complex conjugate of $y_2^{(j)}(m)$, $y_3^{(j)*}(m)$ is the complex conjugate of $y_3^{(j)}(m)$, and $r_1^{(j)}(m)$ and $r_2^{(j)}(m)$ form the jth set of computed signals at the given time interval m.

15. The method for estimation of frequency offset in wireless communications according to claim 14, wherein the combining step combines the J sets of computed signals by taking double summations over a J-dimensional space domain and an M-dimensional time domain:

$$z_1 = \sum_{m=1}^{M} \sum_{j=1}^{J} r_1^{(j)}(m)$$

$$z_2 = \sum_{m=1}^{M} \sum_{j=1}^{J} r_2^{(j)}(m)$$

where $z_1$ and $z_2$ form the set of combined signals.

16. The method for estimation of frequency offset in wireless communications according to claim 15, wherein the estimating step is performed by calculating:

$$\Delta \hat{f} = \frac{1}{2\pi \cdot 2T} \tan^{-1}\left(\frac{-z_2}{z_1}\right)$$

where $\Delta \hat{f}$ is the estimated frequency offset.

* * * * *